United States Patent
Hirose et al.

(10) Patent No.: US 6,453,865 B2
(45) Date of Patent: Sep. 24, 2002

(54) CONTROL APPARATUS FOR IDLING STOP OF INTERNAL COMBUSTION ENGINE AND VEHICLE WITH THE APPARATUS MOUNTED THEREON

(75) Inventors: Kiyoo Hirose, Nagoya (JP); Senji Kato, Aichi-ken (JP); Jun Takahashi, Toyota (JP); Yukikazu Ito, Aichi-ken (JP); Tooru Kitamura, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 09/785,226

(22) Filed: Feb. 20, 2001

(30) Foreign Application Priority Data

Mar. 6, 2000 (JP) ........................................ 2000-060139

(51) Int. Cl.$^7$ ................................................ F02N 11/00
(52) U.S. Cl. .................... 123/179.4; 307/10.6; 180/65.4
(58) Field of Search ...................... 123/179.4; 180/65.2, 180/65.3, 65.4; 477/5; 290/34, 38 E, 38 R, 40 A; 307/10.6

(56) References Cited

U.S. PATENT DOCUMENTS

| | | | |
|---|---|---|---|
| 5,896,750 A | | 4/1999 | Karl |
| 6,048,288 A | | 4/2000 | Tsujii et al. |
| 6,093,974 A | * | 7/2000 | Tabata et al. ............... 180/65.2 |
| 6,360,834 B1 | * | 3/2002 | Gauthier .................... 180/53.5 |

FOREIGN PATENT DOCUMENTS

| | | |
|---|---|---|
| JP | 61-6272 B2 | 2/1986 |
| JP | 8-14145 A | 1/1996 |
| JP | 9-182209 A | 7/1997 |
| JP | 11-147424 A | 6/1999 |

* cited by examiner

Primary Examiner—Gene Mancene
Assistant Examiner—Arnold Castro
(74) Attorney, Agent, or Firm—Oliff & Berridge, PLC

(57) ABSTRACT

The technique of the present invention reduces or even omits potential shocks and vibrations arising due to the coupling action of a coupling mechanism at the time of starting an internal combustion engine, and ensures a quick restart of the internal combustion engine. In a vehicle with an idling stop control apparatus of the present invention mounted thereon, a control unit inputs an inverted phase current Eon, which is determined according to the energy absorbing state of a transmission belt, into an auxiliary machinery driving electric motor, so as to brake rotations of the auxiliary machinery driving electric motor. After the input of the inverted phase current Eon into the auxiliary machinery driving electric motor, the control unit couples an electromagnetic clutch to link a crankshaft of the internal combustion engine with the auxiliary machinery driving electric motor. The value of the inverted phase current Eon is varied according to the energy absorbing state of the transmission belt. The braking force of the auxiliary machinery driving electric motor is thus varied according to the energy absorbing state of the transmission belt.

29 Claims, 8 Drawing Sheets

CONTROL APPARATUS FOR IDLING STOP OF INTERNAL COMBUSTION ENGINE AND VEHICLE WITH THE APPARATUS MOUNTED THEREON

BACKGROUND OF THE INVENTION

1. Field of the Invention

The present invention relates to a technique that controls idling stop of an internal combustion engine, which is carried out according to the driving state of a vehicle.

2. Description of the Related Art

Some proposed vehicles have an idling stop control function that stops driving an internal combustion engine at a temporary stop of the vehicle, for example, at a traffic light during a drive of the vehicle, and restarts driving the internal combustion engine in response to a driver's requirement for a start. In such vehicles having the function of automatically stopping and restarting the operation of the internal combustion engine, an auxiliary machinery driving electric electric motor is linked with the internal combustion engine and auxiliary machinery via fan belts to allow mutual connection thereof. While the internal combustion engine is at a stop, the auxiliary machinery like a water pump is driven by means of the auxiliary machinery driving electric electric motor. In the active state of the internal combustion engine, on the other hand, the auxiliary machinery is driven by means of the internal combustion engine. In order to disconnect the internal combustion engine from the driving system and reduce the loading of the auxiliary machinery driving electric electric motor while the auxiliary machinery is driven by means of the auxiliary machinery driving electric electric motor, a clutch (coupling mechanism) is interposed between the internal combustion engine and the auxiliary machinery driving electric electric motor to couple and release the internal combustion engine with and from the auxiliary machinery driving electric motor.

The auxiliary machinery driving electric motor also functions as the electric motor that restarts driving the internal combustion engine. At a start of driving the internal combustion engine, the clutch couples the internal combustion engine with the auxiliary machinery driving electric motor, which is currently driving the auxiliary machinery. This raises the velocity of the internal combustion engine to a starting speed of revolutions. One proposed technique couples the clutch after reduction of the velocity of the auxiliary machinery driving electric motor at a restart of driving the internal combustion engine, in order to reduce the occurrence of potential shocks and vibrations due to the velocity difference between the internal combustion engine and the auxiliary machinery driving electric motor, which is currently driving the auxiliary machinery.

In some driving states of the vehicle, the shocks and vibrations (energy) arising due to the coupling action of the clutch are not sufficiently absorbed by the fan belt. For example, in the cold time, partly because of the low temperature of the fan belt, the shocks and vibrations occurring due to the coupling action of the clutch are not sufficiently absorbed in the course of restarting the internal combustion engine under the idling stop control. Enhancing the rate of decrease in number of revolutions of the auxiliary machinery driving electric motor or in electric motor velocity to ensure the sufficient absorption, on the other hand, does not fulfil the requirement of quick restart of the internal combustion engine.

SUMMARY OF THE INVENTION

The object of the present invention is thus to reduce or even omit potential shocks and vibrations arising due to the coupling action of a coupling mechanism at the. time of starting an internal combustion engine, and to ensure a quick restart of the internal combustion engine.

At least part of the above and the other related objects is attained by an idling stop control apparatus mounted on a vehicle, wherein auxiliary machinery is driven by means of either one of an internal combustion engine and an electric motor, and an output shaft of the internal combustion engine and an output shaft of the electric motor are linked with each other via a coupling mechanism that is coupled to connect the internal combustion engine with the electric motor and is released to disconnect the internal combustion engine from the electric motor. The coupling mechanism is released and the auxiliary machinery is driven by means of the electric motor via a transmission belt while the internal combustion engine is at a stop. The idling stop control apparatus includes: a decision unit that determines whether a driving stop condition or a driving restart condition of the internal combustion engine is fulfilled; a braking load specification unit that, when the driving restart condition of the internal combustion engine is fulfilled, specifies a braking load to be applied to the electric motor, in order to reduce electric motor velocity or number of revolutions of the electric motor according to a kinetic energy absorbing state of the transmission belt; a drive stand-by unit that, when the driving restart condition of the internal combustion engine is fulfilled and the coupling mechanism is released, causes the output shaft of the internal combustion engine to be coupled with the output shaft of the electric motor via the coupling mechanism after application of the specified braking load to the electric motor; and an internal combustion engine operation control unit that executes a series of processing to restart operation of the internal combustion engine after the internal combustion engine is coupled with the electric motor via the coupling mechanism.

In the idling stop control apparatus of the present invention, the braking load to be applied to the electric motor is specified, in order to reduce the number of revolutions of the electric motor or the electric motor velocity according to the kinetic energy absorbing state of the transmission belt. This arrangement effectively reduces or even omits potential shocks and vibrations arising due to the coupling action of the coupling mechanism at the time of starting the internal combustion engine, and ensures a quick restart of the internal combustion engine.

In accordance with one aspect of the idling stop control apparatus of the present invention, the vehicle has a transmission belt elasticity measurement unit that measures elasticity of the transmission belt, and the braking load specification unit determines the kinetic energy absorbing state of the transmission belt based on the observed elasticity of the transmission belt and increases the braking load with a decrease in observed elasticity of the transmission belt. In accordance with another aspect, the vehicle has a transmission belt temperature measurement unit that measures temperature of the transmission belt, and the braking load specification unit determines the kinetic energy absorbing state of the transmission belt based on the observed temperature of the transmission belt and increases the braking load with a decrease in observed temperature of the transmission belt.

The kinetic energy absorbing state of the transmission belt represents the state that is capable or incapable of sufficiently absorbing energy like shocks and vibrations, and correlates with the properties, such as the elasticity and the hardness, of the transmission belt. Namely measurement of the elasticity of the transmission belt results in specifying the kinetic energy absorbing state of the transmission belt. The properties like the elasticity and the hardness of the transmission belt correlate with the temperature of the transmission belt. These properties can thus be specified according to the temperature of the transmission belt. Under the condition of low temperatures, the transmission belt tends to be cured and lose its elasticity and thus hardly absorbs the potential shocks and vibrations (energy) arising due to the coupling action of the coupling mechanism. Under the condition of high temperatures, on the contrary, the transmission belt readily absorbs the potential shocks and vibrations arising due to the coupling action of the coupling mechanism. The arrangement of varying the braking load by taking into account such conditions attains both the requirement of absorbing potential shocks and vibrations arising due to the coupling action of the coupling mechanism and the requirement of quickly restarting the internal combustion engine.

In one example of the above aspect that measures the temperature of the transmission belt, the transmission belt temperature measurement unit is a cooling fluid temperature measurement unit that measures temperature of a cooling fluid passing through the internal combustion engine. The braking load specification unit determines the kinetic energy absorbing state of the transmission belt based on the observed temperature of the cooling fluid and increases the braking load with a decrease in observed temperature of the cooling fluid. This arrangement enables the temperature of the transmission belt to be obtained indirectly.

In another aspect of this application, the transmission belt temperature measurement unit is an engine velocity accumulation unit that accumulates engine velocity or number of revolutions of the internal combustion engine from a start to a stop of driving of the internal combustion engine. In this aspect, the braking load specification unit determines the kinetic energy absorbing state of the transmission belt based on the accumulated engine velocity and decreases the braking load with an increase in accumulated engine velocity. In still another aspect of this application, the transmission belt temperature measurement unit is an electric motor velocity accumulation unit that accumulates electric motor velocity or number of revolutions of the electric motor after a stop of driving of the internal combustion engine. In this aspect, the braking load specification unit determines the kinetic energy absorbing state of the transmission belt based on the accumulated electric motor velocity and decreases the braking load with an increase in accumulated electric motor velocity. These arrangements enable the temperature of the transmission belt to be obtained by taking into account the frictional heat evolved due to the sliding motions.

In either one of the above aspects, the transmission belt temperature measurement unit further includes an outside air temperature measurement unit that measures outside air temperature, and the braking load specification unit increases a rate of decrease of the braking load with an increase in observed outside air temperature. This arrangement enables the temperature of the transmission belt to be obtained by taking into account the outside air temperature.

The present invention is also directed to a first vehicle having an idling stop function to selectively stop and restart driving an internal combustion engine according to a driving state of the vehicle, wherein auxiliary machinery is driven by means of an electric motor while the internal combustion engine is at a stop and by means of the internal combustion engine while the internal combustion engine is in active state. The first vehicle includes: a coupling mechanism that links an output shaft of the internal combustion engine with an output shaft of the electric motor, such as to be coupled to connect the internal combustion engine with the electric motor and to be released to disconnect the internal combustion engine from the electric motor; a transmission belt that is laid through the output shaft of the internal combustion engine, an input shaft of the auxiliary machinery, and the output shaft of the electric motor; a transmission belt state detection unit that detects a kinetic energy absorbing state of the transmission belt; and an idling stop control unit that specifies a rate of decrease in electric motor velocity or number of revolutions of the electric motor based on the detected kinetic energy absorbing state of the transmission belt, and when a driving restart condition for restarting operation of the internal combustion engine is fulfilled, lowers the electric motor velocity by the specified rate of decrease, causes the output shaft of the internal combustion engine to be coupled with the output shaft of the electric motor via the coupling mechanism, and subsequently carries out a series of processing to restart driving the internal combustion engine.

In the first vehicle of the present invention, the rate of decrease in electric motor velocity is specified based on the kinetic energy absorbing state of the transmission belt. This arrangement effectively reduces or even omits potential shocks and vibrations arising due to the coupling action of the coupling mechanism at the time of starting the internal combustion engine, and enables the vehicle to be quickly restored to the drivable state.

In accordance with one preferable application of the first vehicle of the present invention, the transmission belt state detection unit detects the kinetic energy absorbing state of the transmission belt based on elasticity of the transmission belt, and the idling stop control unit enhances the rate of decrease in electric motor velocity with a decrease in elasticity of the transmission belt. In accordance with another preferable application of the first vehicle of the present invention, the transmission belt state detection unit detects the kinetic energy absorbing state of the transmission belt based on temperature of the transmission belt, and the idling stop control unit enhances the rate of decrease in electric motor velocity with a decrease in temperature of the transmission belt.

In one aspect of the above application that takes into account the temperature of the transmission belt, the vehicle further includes: a heat dissipation unit that is arranged on a windward side of the transmission belt to dissipate heat of a cooling fluid, which has passed through and cooled down the internal combustion engine; and a cooling fluid temperature measurement unit that measures temperature of the cooling fluid. In this aspect, the transmission belt state detection unit calculates the temperature of the transmission belt from the observed temperature of the cooling fluid and detects the kinetic energy absorbing state of the transmission belt based on the calculated temperature of the transmission belt. In this structure, the transmission belt is affected by the amount of heat dissipated by the heat dissipation unit, that is, by the temperature of the cooling fluid. Measurement of the temperature of the cooling fluid thus enables the temperature of the transmission belt to be obtained indirectly.

In another aspect of this application, the vehicle further includes an engine velocity accumulation unit that accumulates engine velocity or number of revolutions of the internal combustion engine from a start to a stop of driving of the internal combustion engine. In this aspect, the transmission belt state detection unit calculates the temperature of the transmission belt from the accumulated engine velocity and detects the kinetic energy absorbing state of the transmission belt based on the calculated temperature of the transmission belt. In still another aspect of this application, the vehicle further includes an electric motor velocity accumulation unit that accumulates electric motor velocity or number of revolutions of the electric motor after a stop of driving of the internal combustion engine. In this aspect, the transmission belt state detection unit calculates the temperature of the transmission belt from the accumulated electric motor velocity and detects the kinetic energy absorbing state of the transmission belt based on the calculated temperature of the transmission belt. These arrangements enable the temperature of the transmission belt to be obtained by taking into account the frictional heat evolved due to the sliding motions.

In either one of the above aspects, the vehicle further includes an outside air temperature measurement unit that measures outside air temperature. The transmission belt state detection unit calculates the temperature of the transmission belt from the observed outside air temperature in addition to at least one of the observed temperature of the cooling fluid, the accumulated engine velocity, and the accumulated electric motor velocity and detects the kinetic energy absorbing state of the transmission belt based on the calculated temperature of the transmission belt. This arrangement enables the temperature of the transmission belt to be obtained by taking into account the outside air temperature.

In the first vehicle having any of the above configurations, the idling stop control unit stops driving the internal combustion engine and releases the coupling mechanism when a driving stop condition of the internal combustion engine is fulfilled.

The present invention is further directed to a second vehicle having an idling stop function to selectively stop and restart driving an internal combustion engine according to a driving state of the vehicle, wherein auxiliary machinery is driven by means of an electric motor via a transmission belt while the internal combustion engine is at a stop and by means of the internal combustion engine while the internal combustion engine is in active state. The second vehicle includes: a coupling mechanism that links an output shaft of the internal combustion engine with an output shaft of the electric motor, such as to be coupled to connect the internal combustion engine with the electric motor and to be released to disconnect the internal combustion engine from the electric motor; a target braking velocity determination unit that determines a target braking velocity for braking the electric motor prior to a restart of driving of the internal combustion engine by taking into account temperature of the transmission belt; and an idling stop control unit that, when a driving restart condition for restarting operation of the internal combustion engine is fulfilled, drives the electric motor at the target braking velocity, causes the output shaft of the internal combustion engine to be coupled with the output shaft of the electric motor via the coupling mechanism, and subsequently carries out a series of processing to restart driving the internal combustion engine.

In the second vehicle of the present invention, the target braking velocity for braking the electric motor is determined by taking into account the temperature of the transmission belt. This arrangement effectively reduces or even omits potential shocks and vibrations arising due to the coupling action of the coupling mechanism at the time of starting the internal combustion engine, and enables the vehicle to be quickly restored to the drivable state.

In accordance with one preferable application of the present invention, the second vehicle further includes: a heat dissipation unit that is arranged on a windward side of the transmission belt to dissipate heat of a cooling fluid, which has passed through and cooled down the internal combustion engine; and a cooling fluid temperature measurement unit that measures temperature of the cooling fluid. In this application, the target braking velocity determination unit takes into account the temperature of the transmission belt based on the observed temperature of the cooling fluid and lowers the target braking velocity with a decrease in observed temperature of the cooling fluid. In this structure, the transmission belt is affected by the amount of heat dissipated by the heat dissipation unit, that is, by the temperature of the cooling fluid. Measurement of the temperature of the cooling fluid thus enables the temperature of the transmission belt to be taken into account.

Like the first vehicle discussed above, in the second vehicle of the present invention, the target braking velocity determination unit takes into account the temperature of the transmission belt based on the accumulated engine velocity or the accumulated electric motor velocity, namely based on the frictional heat evolved due to the sliding motions. The rate of increase in target braking velocity may be varied according to the observed outside air temperature.

In the second vehicle having any of the above configurations, the idling stop control unit stops driving the internal combustion engine and releases the coupling mechanism when a driving stop condition of the internal combustion engine is fulfilled.

The present invention is also directed to a method of controlling idling stop in a vehicle that has an idling stop function to selectively stop and restart driving an internal combustion engine according to a driving state of the vehicle, wherein auxiliary machinery is driven by means of an electric motor while the internal combustion engine is at a stop. The method includes the steps of: detecting a kinetic energy absorbing state of a transmission belt that is laid through the internal combustion engine, the electric motor, and the auxiliary machinery; determining whether or not a driving restart condition for restarting operation of the internal combustion engine is fulfilled; when it is determined that the driving restart condition is fulfilled, specifying a rate of decrease in electric motor velocity or number of revolutions of the electric motor based on the detected kinetic energy absorbing state of the transmission belt; and lowering the electric motor velocity by the specified rate of decrease and subsequently causing the output shaft of the internal combustion engine to be coupled with the output shaft of the electric motor via the coupling mechanism, so as to restart driving the internal combustion engine.

In the method of the present invention, the rate of decrease in electric motor velocity is specified based on the kinetic energy absorbing state of the transmission belt. This arrangement effectively reduces or even omits potential shocks and vibrations arising due to the coupling action of the coupling mechanism at the time of starting the internal combustion engine, and ensures a quick restart of the internal combustion engine.

In accordance with one preferable application of the present invention, the method further includes the steps of: measuring elasticity of the transmission belt; detecting the kinetic energy absorbing state of the transmission belt based on the observed elasticity of the transmission belt; and enhancing the rate of decrease in electric motor velocity with a decrease in observed elasticity of the transmission belt. In accordance with another preferable application of the present invention, the method further includes the steps of:

measuring temperature of the transmission belt; detecting the kinetic energy absorbing state of the transmission belt based on the observed temperature of the transmission belt; and enhancing the rate of decrease in electric motor velocity with a decrease in observed temperature of the transmission belt. The kinetic energy absorbing state of the transmission belt in the method is synonymous with the kinetic energy absorbing state of the transmission belt in the idling stop control apparatus of the present invention discussed above.

In one aspect of the above application that measures the temperature of the transmission belt, the method further includes the steps of: measuring temperature of a cooling fluid that passed through the internal combustion engine; and enhancing the rate of decrease in electric motor velocity with a decrease in observed temperature of the cooling fluid. This arrangement enables the temperature of the transmission belt to be obtained indirectly.

In another aspect of this application, the method further includes the steps of: accumulating engine velocity or number of revolutions of the internal combustion engine from a start to a stop of driving of the internal combustion engine; and lowering the rate of decrease in electric motor velocity with an increase in accumulated engine velocity. In still another aspect of this application, the method further includes the steps of: accumulating electric motor velocity or number of revolutions of the electric motor after a stop of driving of the internal combustion engine; and lowering the rate of decrease in electric motor velocity with an increase in accumulated electric motor velocity. These arrangements enable the temperature of the transmission belt to be obtained by taking into account the frictional heat evolved due to the sliding motions.

In either one of the above aspects, the method further includes the steps of: measuring an outside air temperature; and enhancing the rate of decrease in electric motor velocity with an increase in observed outside air temperature. This arrangement enables the rate of decrease in electric motor velocity to be varied according to the observed outside air temperature.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
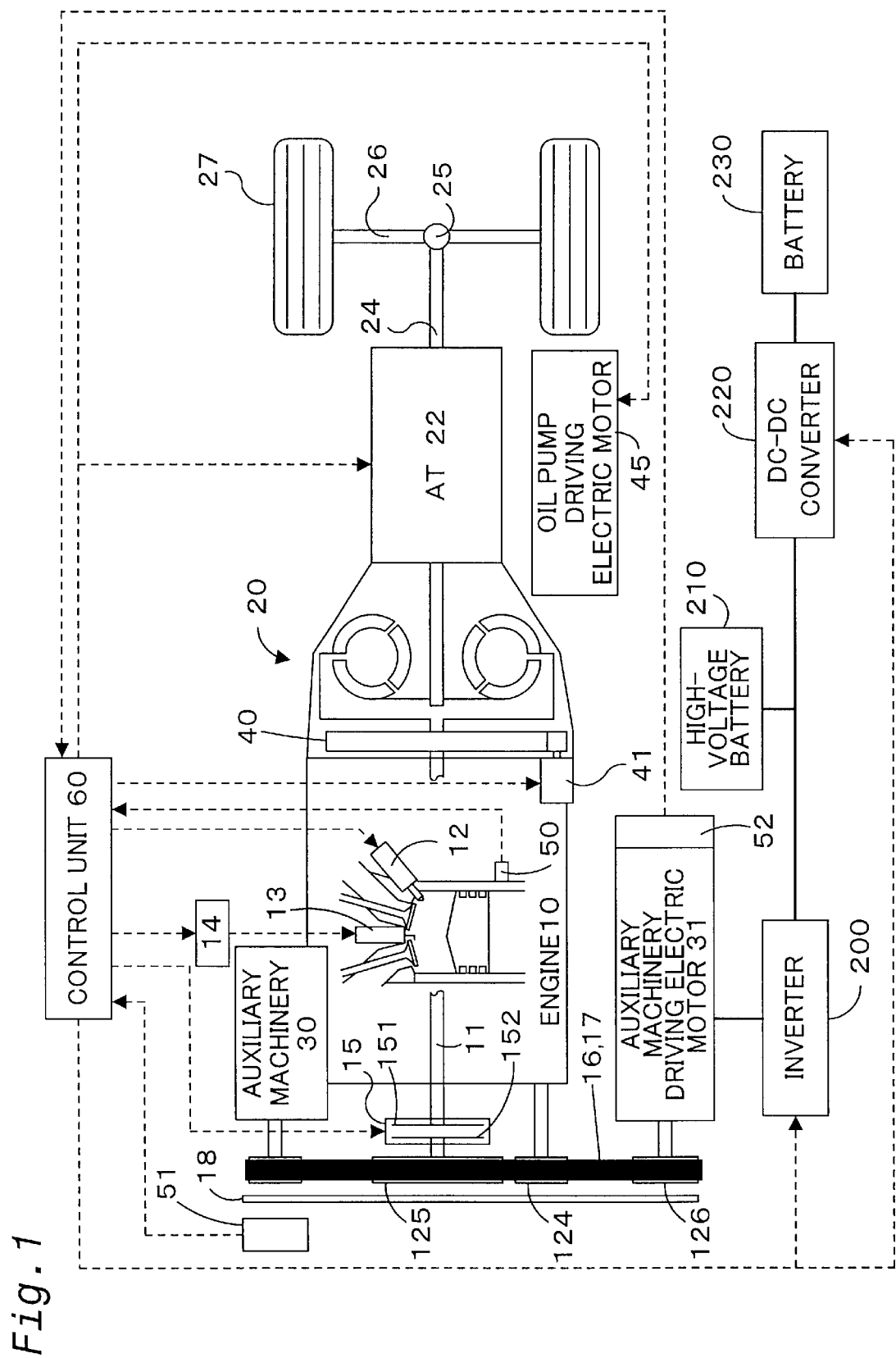
FIG. 1 is a block diagram schematically illustrating the structure of a vehicle to which an idling stop control apparatus is applied as one embodiment of the present invention.

An idling stop control apparatus embodying the present invention is described below with referring to the drawings.

Figure 2:
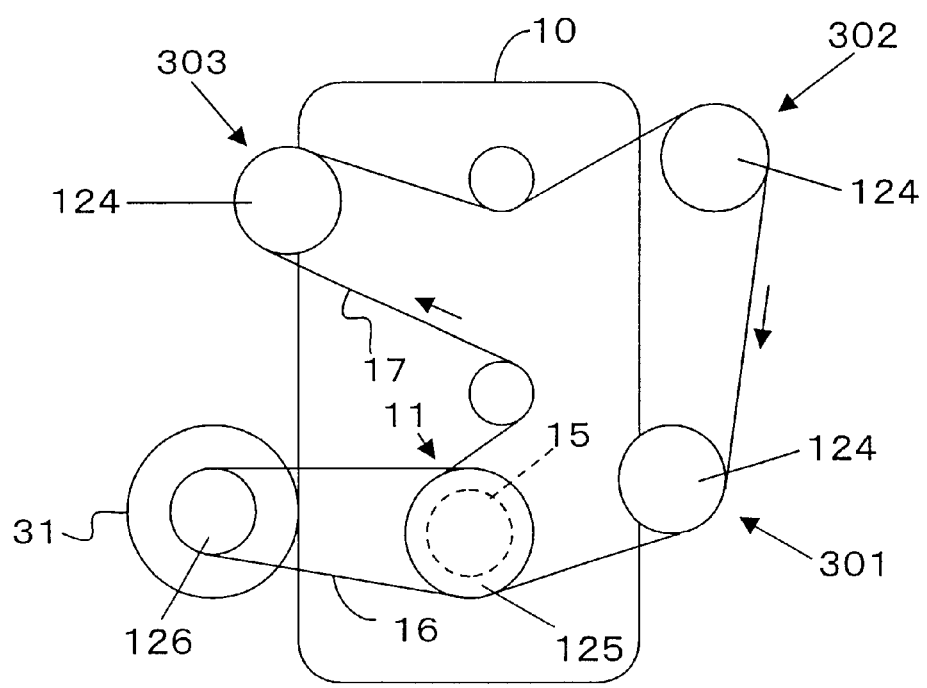
FIG. 2 shows the arrangement of an engine, auxiliary machinery, and an auxiliary machinery driving electric motor mutually linked via a transmission belt in the embodiment.

The description first regards the structure of a vehicle, on which the idling stop control apparatus of the embodiment is mounted, based on the illustrations of FIGS. 1 and 2. FIG. 1 is a block diagram schematically illustrating the structure of a vehicle to which the idling stop control apparatus of the embodiment is applied. FIG. 2 shows the arrangement of an engine, auxiliary machinery, and an auxiliary machinery driving electric motor mutually linked via a transmission belt.

The vehicle includes an engine (internal combustion engine) 10 that functions as a power source, a torque converter 20 that amplifies the output torque of the engine 10, and an automatic transmission (AT) 22 that automatically varies the gear ratio between a maximum gear ratio and a minimum gear ratio discretely. The engine 10 is linked with a power input shaft of the torque converter 20 via a crankshaft (output shaft) 11. A power output shaft of the torque converter 20 is linked with a power input shaft of the AT 22. A power output shaft of the AT 22 is linked with a drive shaft 24. The drive shaft 24 is connected with wheels 27 via a differential gear (including a final gear) 25 and an axle 26.

The engine 10 is a direct injection gasoline engine, in which a fuel (for example, gasoline) is directly injected into a cylinder. The engine 10 has a high-pressure injector 12 to inject a supply of gasoline into the cylinder and an ignition plug 13 to ignite a gaseous mixture of the gasoline injected into the cylinder and the intake air. A high-pressure supply of gasoline, which is pressurized by a high-pressure fuel pump (not shown), is led into the high-pressure injector 12. When the high-pressure injector 12 is activated to open in response to an injection signal output from a control unit 60, the supply of gasoline is sprayed into the cylinder. A high voltage is applied from an igniter 14 to the ignition plug 13 in response to an ignition signal output from the control unit 60. The engine 10 is provided with a cooling fluid temperature sensor 50 that measures the temperature of a cooling fluid used to cool down the engine 10. An outside air temperature sensor 51 that measures the outside air temperature is disposed on the front side of the engine 10 (that is, on the foreside of the vehicle and on the left side in FIG. 1).

Referring to FIGS. 1 and 2, auxiliary machinery 30 including a water pump 301, a compressor 302 for air conditioner, and a pump 303 for power steering and an auxiliary machinery driving electric motor 31 used to drive the auxiliary machinery 30 while the engine 10 is at a stop by a series of idling stop control process are arranged in the periphery of the engine 10. Pulleys 124 are attached to the respective one ends of power input shafts of the auxiliary machinery 301, 302, and 303, whereas a pulley 125 is attached to one end of the crankshaft 11 of the engine 10. A transmission belt 16 is spanned between the pulley 125 of the engine 10 and a pulley 126 of the auxiliary machinery driving electric motor 31 to start the engine 10 by means of the auxiliary machinery driving electric motor 31. The pulley ratio of the pulley 125 to the pulley 126 is generally in the range between 1 to 2 and 1 to 3. A transmission belt 17 is laid along the pulleys 124 and 125. The output of the engine 10 is transmitted to the respective power input shafts of the auxiliary machinery 30 via the transmission belt 17, while the output of the auxiliary machinery driving electric motor 31 is transmitted to the respective power input shafts of the auxiliary machinery 30 via the transmission belts 16 and 17. The transmission belts 16 and 17 may be V-shaped belts having a trapezoidal cross section or V rib belts that are thinner and wider than the V-shaped belts and have a plurality of V-shaped grooves along the direction of rotations. The material of the transmission belts 16 and 17 varies its shock- and vibration-absorbing properties, depending upon the temperature. A radiator 18 is disposed in front of (that is, on the windward side of) the transmission belts 16 and 17 to dissipate the heat of the cooling fluid that has passed through the engine 10.

A wet multi-plate electromagnetic clutch 15 is interposed between the crankshaft 11 and the pulley 125. The electromagnetic clutch 15 has a clutch plate 151 and a fly wheel 152. The electromagnetic clutch 15 may be provided separately from the pulley 125 as shown in FIG. 1 or alternatively be incorporated in the pulley 125. The electromagnetic clutch 15 connects and disconnects the power transmission between the crankshaft 11 and the transmission belt 16. The electromagnetic clutch 15 includes a damper (not shown) to relieve potential shocks and vibrations occurring at the time of coupling.

While the vehicle runs or while the vehicle stops in the active state of the engine 10, the electromagnetic clutch 15 is coupled to transmit the driving force of the crankshaft 11 via the transmission belt 17. The water pump 301, the compressor 302 for air conditioner, and the pump 303 for power steering are accordingly driven by means of the engine 10. While the engine 10 is at a stop by the series of idling stop control process, on the other hand, the electromagnetic clutch 15 is released to mechanically separate the crankshaft 11 from the transmission belt 17 (that is, from the pulley 125). The water pump 301, the compressor 302 for air conditioner, and the pump 303 for power steering are accordingly driven by the auxiliary machinery driving electric motor 31 via the transmission belt 16 and the pulley 125. Under such conditions, the crankshaft 11 is mechanically separated from the pulley 125 and the transmission belts 16 and 17. The auxiliary machinery driving electric motor 31 is thus not required to drive the crankshaft 11. This arrangement desirably relieves the loading applied to the auxiliary machinery driving electric motor 31.

The auxiliary machinery driving electric motor 31 is a three-phase electric motor that has three-phase coils on a stator and functions as the driving source to drive the crankshaft 11 at the time of restarting the engine 10 as well as the driving source to drive the auxiliary machinery 30. The auxiliary machinery driving electric motor 31 also functions as an alternator that is driven by the engine 10 in the active state to generate electric power. The auxiliary machinery driving electric motor 31 is driven and controlled by an inverter 200 in response to a driving signal output from the control unit 60. The inverter 200 is connected to a high voltage battery 210 and a DC—DC converter 220. The high voltage battery 210 is specifically used as the power source to drive the auxiliary machinery driving electric motor 31. While the auxiliary machinery driving electric motor 31 works as the alternator, the generated electric power is stored in the high voltage battery 210. The DC—DC converter 220 is connected to the control unit 60 to lower the voltage of the high voltage battery 210 or the voltage of the electric power generated by the auxiliary machinery driving electric motor 31 and thereby charge a battery 230. The battery 230 is used as the power source to drive a starter electric motor 41, an oil pump driving electric motor 45, and the control unit 60 (all discussed later). The structure of this embodiment includes both the high voltage battery 210 to drive the auxiliary machinery driving electric motor 31 and the battery 230 to drive the control unit 60 and the other electric motors 41 and 45. A modified structure may include only the high voltage battery 210 and supply the electric power of the lowered voltage via the DC—DC converter 220 to the control unit 60 and the other electric motors 41 and 45.

A starter ring gear 40 linked with the crankshaft 11 is interposed between the engine 10 and the torque converter 20. A gear of the starter electric motor 41 is arranged to allow engagement with the starter ring gear 40. The starter electric motor 41 uses the battery 230 as the power source and drives and rotates the engine 10 only at the time of starting the engine 10 in response to an operation of an ignition switch (not shown), that is, at the time of starting the engine 10 except the occasions of restarting the engine 10 in the series of idling stop control process. The gear of the starter electric motor 41 engages with the starter ring gear 40 only at the time of starting the engine 10 under the condition that an ignition position sensor 58 detects a change of the ignition position from ON to STA. The gear of the starter electric motor 41 otherwise disengages from the starter ring gear 40 but is kept at a separate stand-by position. As mentioned previously, the auxiliary machinery driving electric motor 31 functions as the starter electric motor at the time of restarting the engine 10 in the series of idling stop control process. In the structure of the embodiment, at the time of starting the operation of the engine 10 (that is, at the first time of starting the engine 10), the starter electric motor 41 is in charge of starting the engine 10. At the time of restarting the operation of the engine 10, the auxiliary machinery driving electric motor 31 is in charge of starting the engine 10. The starter electric motor 41 starts the engine 10 via the ring gear 40 that naturally causes gear noise. The gear noise makes a significant problem in the case of frequent repetition of the starting operation. Another potential problem under the idling stop control process is wear of the gear due to the frequent repetition of the starting operation. The auxiliary machinery driving electric motor 31 is linked with the crankshaft 11 via the transmission belt 16. The crankshaft 11 may thus not be driven or rotated under the condition of high viscosity of a lubricant, for example, in the cold and may fail to start the engine 10. At the first time of starting the engine 10, the starter electric motor 41 is accordingly used to start the engine 10. At the time of restarting the engine 10, the auxiliary machinery driving electric motor 31 is used to start the engine 10.

The torque converter 20 is a general fluid torque converter, which amplifies the driving torque input into the input shaft and outputs the amplified torque from the output shaft. The detailed structure and functions of the torque converter are well known in the art and are thus not specifically described here. The automatic transmission (AT) 22 includes a planetary gear and automatically varies the gear combination via a hydraulic actuator (not shown)

according to the vehicle speed and the step-on amount of the accelerator pedal, so as to change the gear ratio. The output shaft of the AT 22 is linked with the drive shaft 24, and the driving force output from the output shaft of the AT 22 is transmitted to the wheels 27 via the drive shaft 24, the differential gear 25, and the axle 26. The oil pump driving electric motor 45 is disposed in the vicinity of the AT 22 to keep the hydraulic pressure of the driving system even during a stop of the engine 10. The oil pump driving electric motor 45 is driven with the battery 230 as the power source.

Figure 3:
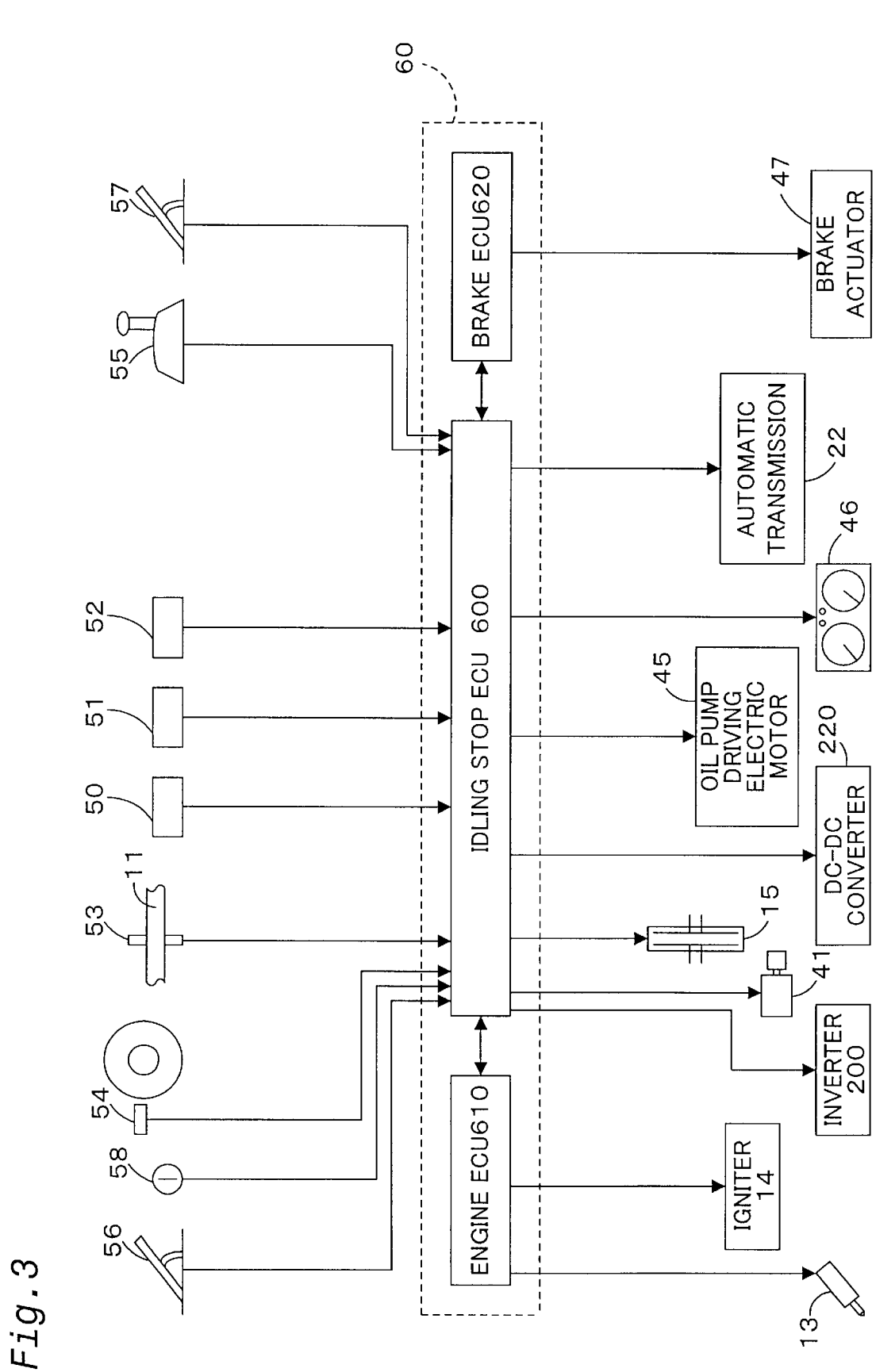
FIG. 3 shows a control system adopted in the vehicle of the embodiment.

The control system of the vehicle in this embodiment is described below with referring to FIG. 3. FIG. 3 shows the control system adopted in the vehicle of the embodiment. The control unit 60 includes an idling stop ECU (electronic control unit) 600, an engine ECU 610, and a brake ECU 620. Each of the ECUs 600, 610, and 620 includes a CPU, a ROM, a RAM, and other related elements. These ECUs are only illustrative. For example, an ECU for controlling the AT 22 may be separate from the idling stop ECU 600.

The idling stop ECU 600 is mainly in charge of the idling stop control carried by the control unit 60. The idling stop ECU 600 is connected to the engine ECU 610 and the brake ECU 620 via signal lines to allow mutual communications. The idling stop ECU 600 connects via signal lines with a cooling fluid temperature sensor 50 that measures the temperature of an engine cooling fluid, an outside air temperature sensor 51 that measures the temperature of the outside air, an electric motor velocity sensor 52 that measures the number of revolutions or velocity of the auxiliary machinery driving electric motor 31, an engine velocity sensor 53 that measures the number of revolutions or velocity of the crankshaft 11 of the engine 10, a vehicle speed sensor 54 that measures the vehicle speed, a gearshift position sensor 55 that detects the current gear position, an accelerator travel sensor 56 that specifies the position of the accelerator pedal as the accelerator travel, a brake pedal sensor 57 that specifies the step-on state of the brake pedal, and an ignition position sensor 58 that detects the position of the ignition switch. The idling stop ECU 600 is also connected to the inverter 200, the starter electric motor 41, the electromagnetic clutch 15, the DC-DC converter 220, the oil pump driving electric motor 45, the AT 22, and a gauge panel 46.

The idling stop ECU 600 regulates the velocity of the auxiliary machinery driving electric motor 31 via the inverter 200, so as to make the auxiliary machinery 30 driven while the engine 10 is at a stop by the idling stop control process. In order to restart driving the engine 10 that is in the idling stop state, the auxiliary machinery driving electric motor 31 drives and rotates the crankshaft 11 of the engine 10 and raises the engine velocity to a starting speed, instead of the starter electric motor 41. The idling stop ECU 600 controls an electromagnetic actuator (not shown) of the electromagnetic clutch 15 to couple and release the clutch plate 151 with and from the fly wheel 152, thereby controlling transmission and blockage of the power. The idling stop ECU 600 controls the hydraulic actuator (not shown) based on the data sent from the vehicle speed sensor 54, the gearshift position sensor 55, and the accelerator travel sensor 56, and changes the gear ratio at an optimum change speed point. Programs for executing the idling stop control process of this embodiment are stored in the ROM of the idling stop ECU 600.

The engine ECU 610 regulates the amount of fuel injection via the injector 12 and controls the ignition timing via the igniter 14 in response to a request from the idling stop ECU 600, thereby controlling the driving conditions of the engine 10. While the vehicle is at a stop according to the idling stop control process, the engine ECU 610 ceases the fuel injection via the injector 12 to the engine 10 in response to a request from the idling stop ECU 600, so as to stop operation of the engine 10.

The brake ECU 620 is connected with a brake actuator 47 and controls the brake actuator 47 to keep the brake hydraulic pressure until the driving force of the engine 10 rises to a sufficient level in the process of restarting the engine 10 that is in the idling stop state. The state in which the driving force of the engine 10 rises to the sufficient level means that the vehicle is kept at a stop, for example, on a slope even when the brake pedal is released.

General operations of the vehicle having the above construction are discussed below with reference to FIGS. 1 through 3. When the ignition position sensor 58 detects a change of the ignition position from ON to STA (the engine starting position) while the gearshift lever is either in a parking position P or a neutral position N, the idling stop ECU 600 causes the gear of the starter electric motor 41 to engage with the ring gear 40 and subsequently drives the starter electric motor 41 to rotate the crankshaft 11 to the engine starting speed. The idling stop ECU 600 simultaneously requests the engine ECU 610 to carry out an engine starting process. The engine ECU 610 causes a preset quantity of the fuel to be supplied into the cylinder of the engine 10 via the injector 12 and carries out the engine starting process that ignites the fuel supplied into the engine cylinder via the igniter 14 and the ignition plug. When the engine 10 starts driving, the gear of the starter electric motor 41 is separate from the ring gear 40 and returned to its stand-by position. When the driver shifts the gearshift lever to a drive position D and steps on the accelerator pedal, the vehicle starts. The idling stop ECU 600 and the engine ECU 610 then control operations of the engine 10 and the change speed process of the AT 22, based on the data sent from, for example, the engine velocity sensor 53, the vehicle speed sensor 54, and the accelerator travel sensor 56.

Figure 4:
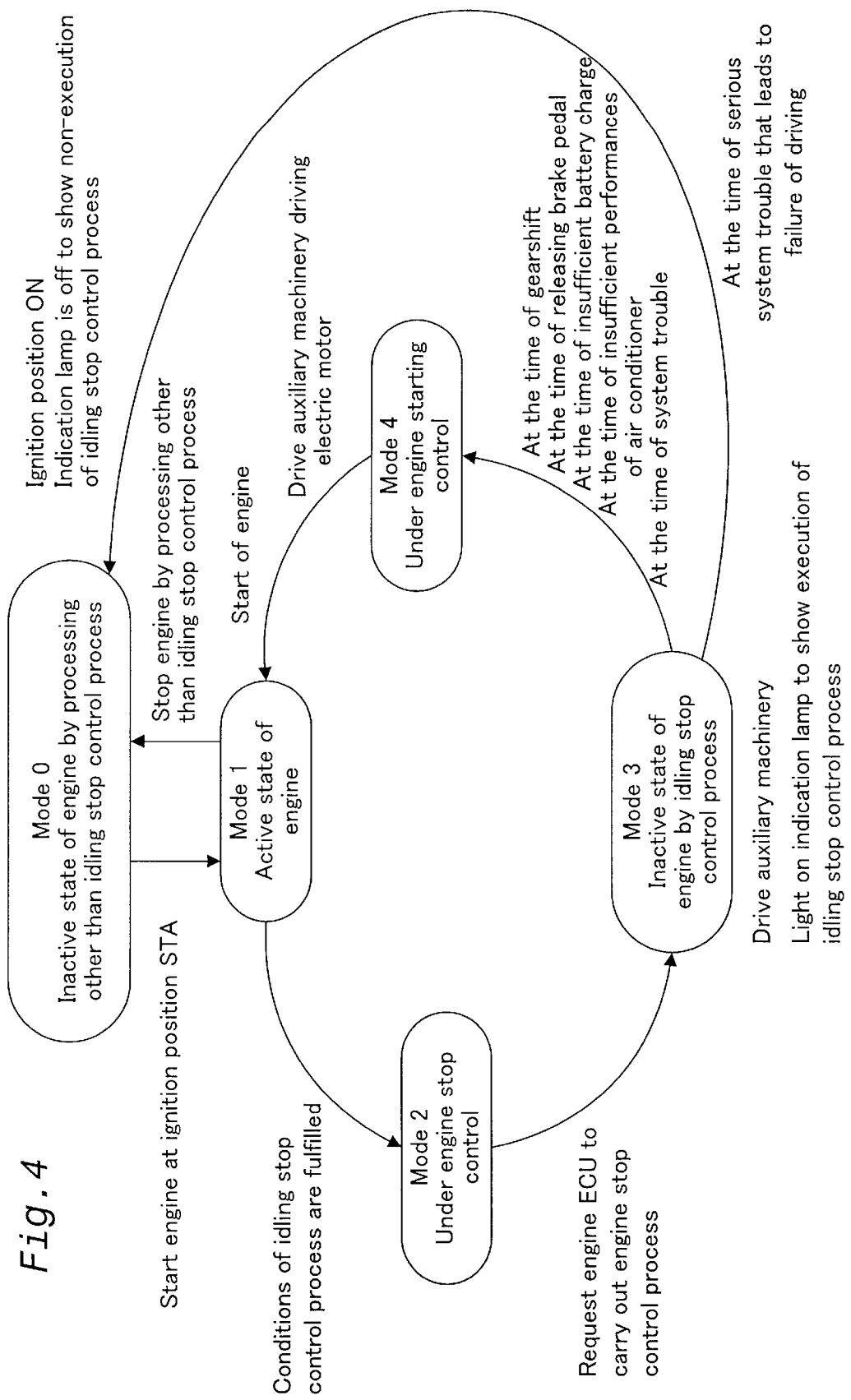
FIG. 4 is a state transition diagram showing a series of idling stop control process.

In the structure of this embodiment, the idling stop ECU 600 carries out the idling stop control process to stop driving the engine 10 at a temporary stop of the vehicle, for example, at a traffic light during a drive of the vehicle under predetermined conditions. The details of the idling stop control process are discussed below with reference to FIG. 4. FIG. 4 is a state transition diagram showing a series of idling stop control process.

When the ignition position sensor 58 detects a change of the ignition position from OFF to ON, the idling stop ECU 600 selects a mode '0' that represents the inactive state of the engine 10 by any processing other than the idling stop control process. In the state of mode '0', an indicator lamp, which is lit during execution of the idling stop control process, on the gauge panel 46 is off. When the ignition position sensor 58 detects a change of the ignition position from ON to STA, the starter electric motor 41 starts driving the engine 10 as described previously. The idling stop ECU 600 here selects a mode '1' that represents the active state of the engine 10. In the state of mode '1', the vehicle is either in the driving state or at a stop while the engine 10 continues driving. In this state, the idling stop ECU 600 couples the electromagnetic clutch 15 to link the crankshaft 11 with the transmission belt 17. The auxiliary machinery 30 is thus driven by the driving force of the engine 10. The auxiliary machinery driving electric motor 31 is driven by the engine 10 via the transmission belt 16 and functions as the alternator or is at an idle when the high-voltage battery 210 is in the full charge level.

When it is determined that predetermined conditions of the idling stop control process are fulfilled, the idling stop ECU 600 selects a mode '2' that represents the transient state to stop driving the engine 10. The predetermined conditions of the idling stop control process include that the vehicle speed measured by the vehicle speed sensor 54 is equal to zero, that the step-on of the brake pedal is detected by the brake pedal sensor 57, and that current gearshift position detected by the gearshift position sensor 55 is the neutral position N. In the state of mode '2', the idling stop ECU 600 requests the engine ECU 610 to stop the fuel supply. The idling stop ECU 600 also request the brake ECU 620 to keep the braking state. The brake ECU 620 regulates the brake actuator 47 and keeps the brake hydraulic pressure corresponding to the step-on amount of the brake pedal.

When it is determined that the engine 10 is at a stop, based on the data sent from the engine velocity sensor 53, the idling stop ECU 600 selects a mode '3' that represents the inactive state of the engine 10 by the idling stop control process. In the state of mode '3', the idling stop ECU 600 lights on the indicator lamp on the gauge panel 46 to show the execution of the idling stop control process. The idling stop ECU 600 also releases the electromagnetic clutch 15 to disconnect the crankshaft 11 from the transmission belts 16 and 17 and causes the auxiliary machinery driving electric motor 31 to drive the respective auxiliary machinery 301, 302, and 303 via the transmission belt 17.

In response to detection of a request to terminate the idling stop control process, the idling stop ECU 600 selects a mode '4' that represents the engine starting control state to restart driving the engine 10. The idling stop ECU 600 detects the request to terminate the idling stop control process, for example, when the gearshift lever is shifted from the neutral position N to the drive position D, when the brake pedal is released, when the charging rate of the battery becomes lower than a lower limit or a charging requirement level, when the air conditioner has insufficient cooling performances, and when some system trouble occurs. In the state of mode '4', the idling stop ECU 600 brakes the auxiliary machinery driving electric motor 31 to reduce the number of revolutions or velocity of the auxiliary machinery driving electric motor 31, prior to the coupling of the electromagnetic clutch 15. The idling stop ECU 600 couples the electromagnetic clutch 15 at a coupling timing determined by an electromagnetic clutch coupling timing delay process (discussed later) and subsequently raises the velocity of the auxiliary machinery driving electric motor 31 to the engine starting speed. The idling stop ECU 600 also requests the engine ECU 610 to carry out the fuel supply and spark ignition. In response to detection of any serious system trouble that leads to failure of driving, the idling stop ECU 600 selects the mode '0'.

Figure 5:
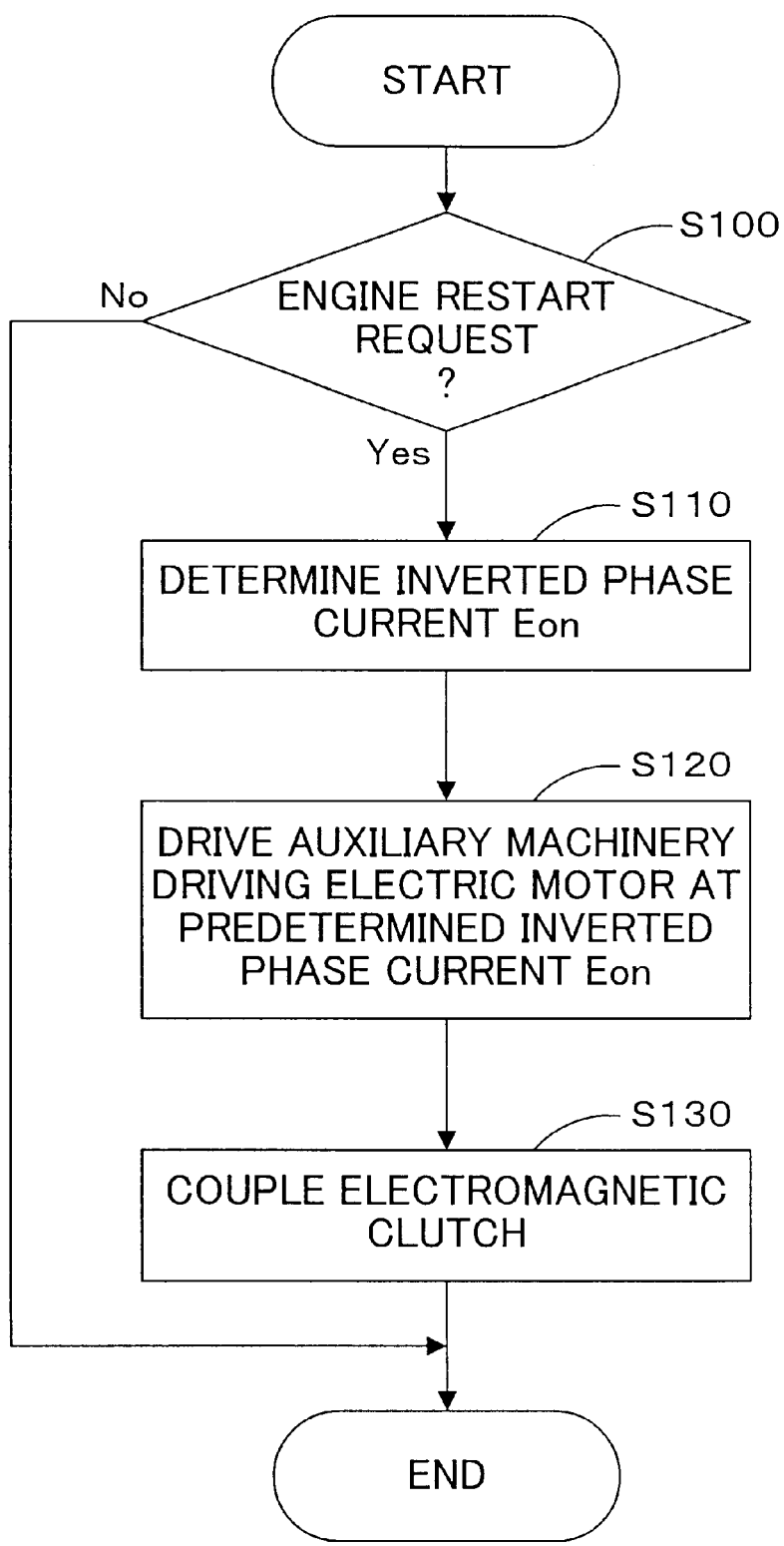
FIG. 5 is a flowchart showing a routine of controlling an electromagnetic clutch executed at the time of restarting operation of the engine.
Figure 6:
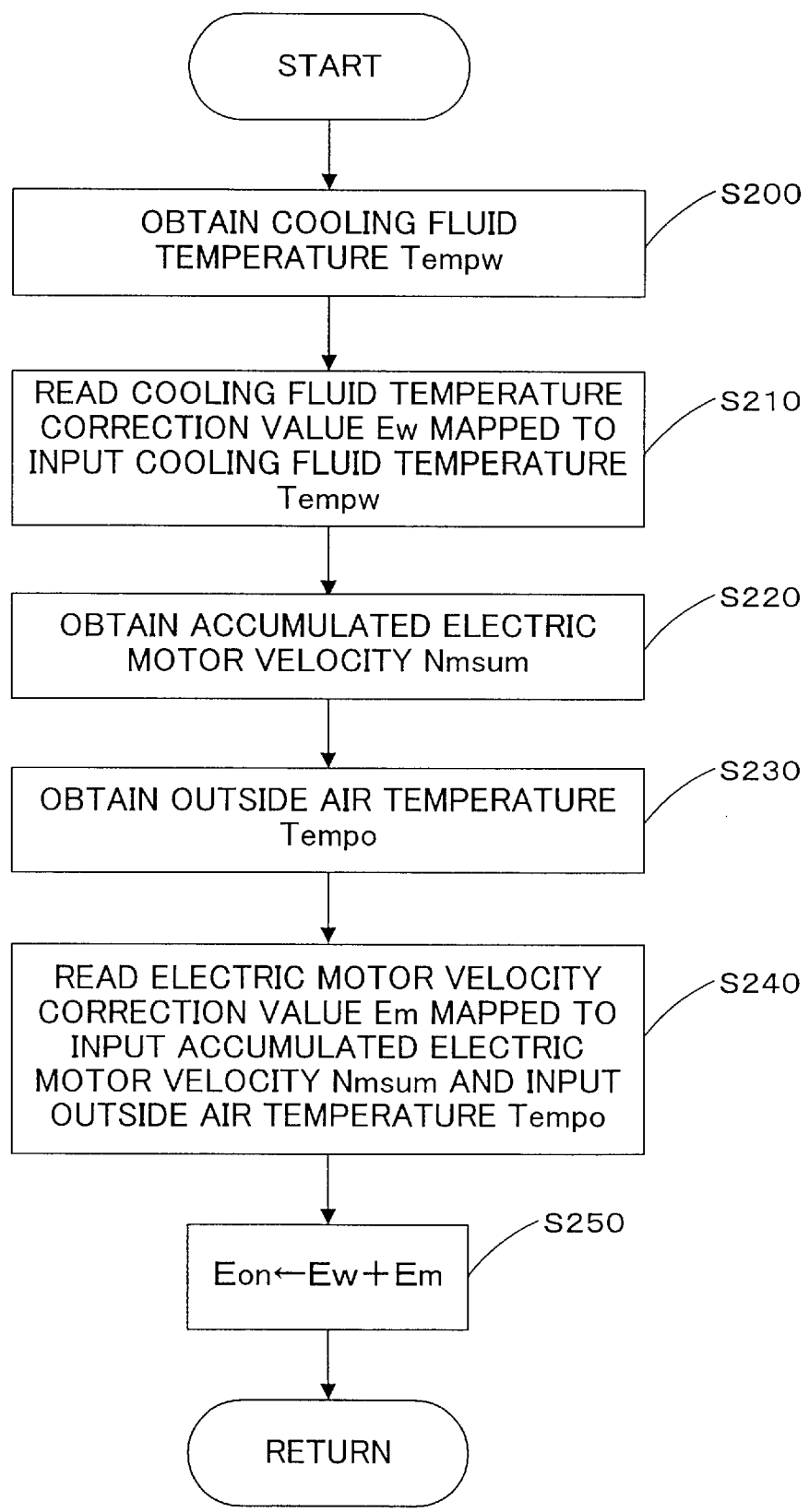
FIG. 6 is a flowchart showing a routine of determining the inverted phase current, which is to be input into the auxiliary machinery driving electric motor, by taking into account the temperature of the transmission belt.
Figure 7:
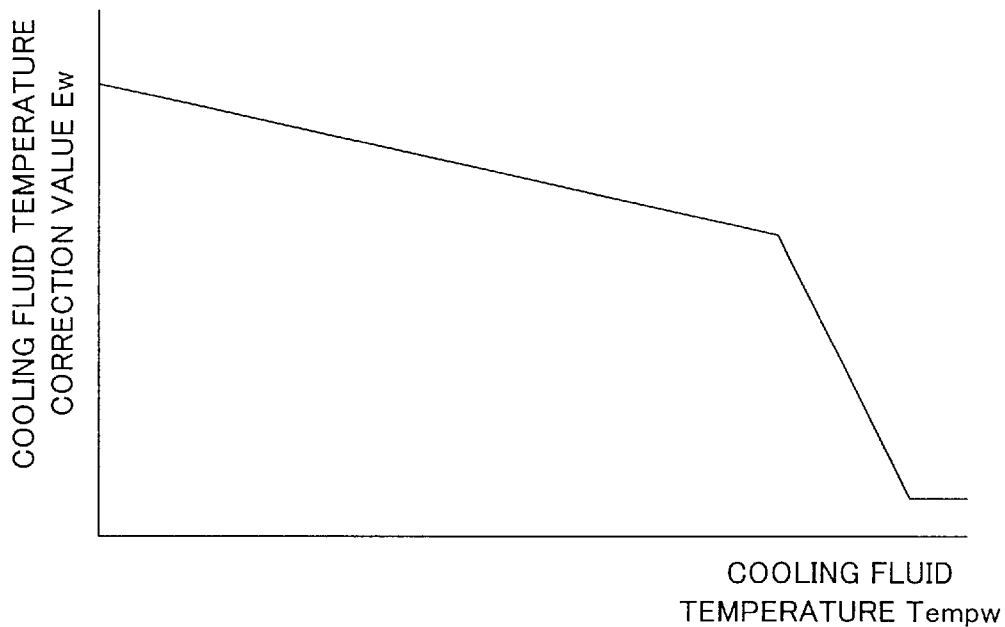
FIG. 7 is a map used to specify a cooling fluid temperature correction value Ew based on the temperature of the cooling fluid passing through the engine.
Figure 8:
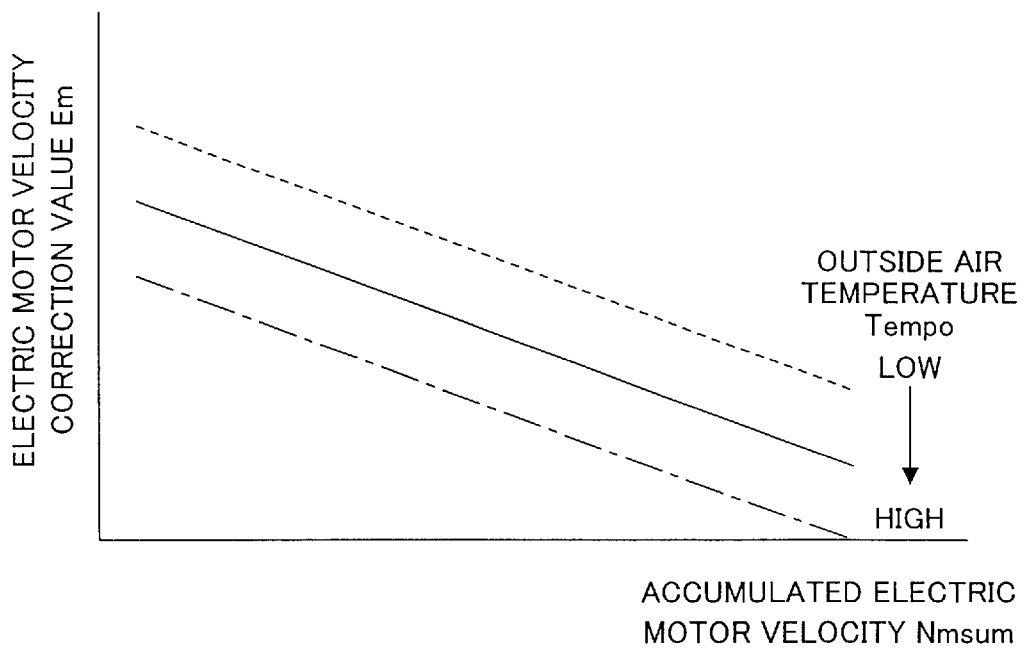
FIG. 8 is a map used to specify an electric motor velocity correction value Em based on the outside air temperature and the accumulated electric motor velocity Nmsum of the auxiliary machinery driving electric motor.
Figure 9:
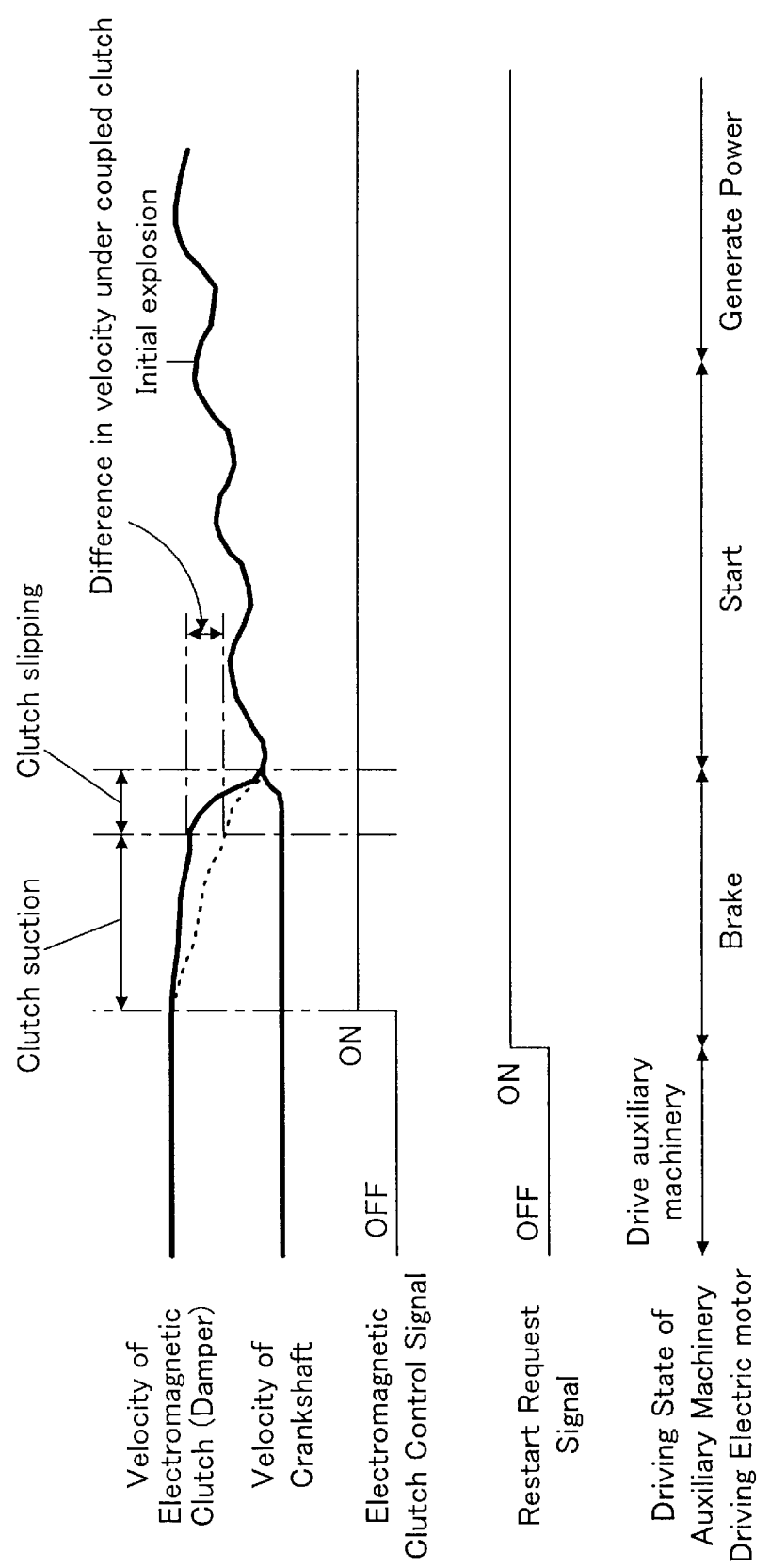
FIG. 9 is a timing chart showing variations in coupling timing of the electromagnetic clutch, the driving state of the auxiliary machinery driving electric motor, the number of revolutions of the damper or damper velocity, and the number of revolution of a crankshaft or crankshaft velocity with time.

In response to detection of a start of the engine 10, the idling stop ECU 600 selects the mode '1'. The idling stop ECU 600 determines that the engine 10 is at a start, for example, when the engine velocity measured by the engine velocity sensor 53 is not less than 500 rpm. The idling stop ECU 600 here requests the brake ECU 620 to release the sustained brake hydraulic pressure. The brake ECU 620 regulates the brake actuator 47 to release the sustained brake hydraulic pressure and sets the non-braking state. In the state of mode '1', when the ignition position sensor 58 detects a change of the ignition position from ON to OFF, the idling stop ECU 600 selects the mode The following describes a series of processing to control the 5 electromagnetic clutch 15 and the auxiliary machinery driving electric motor 31, which is executed at the time of restarting operation of the engine 10 in this embodiment, with referring to FIGS. 5 through 9. FIG. 5 is a flowchart showing a processing routine of controlling the electromagnetic clutch 15 and the auxiliary machinery driving electric motor 31, which is executed at the time of restarting operation of the engine 10. FIG. 6 is a flowchart showing a routine of determining the quantity of power generation (the inverted phase current) of the auxiliary machinery driving electric motor 31 by taking into account the temperature of the transmission belt 16. FIG. 7 is a map used to specify a cooling fluid temperature correction value Ew based on the temperature of the cooling fluid passing through the engine 10. FIG. 8 is a map used to specify an electric motor velocity correction value Em based on the outside air temperature and the accumulated electric motor velocity Nmsum of the auxiliary machinery driving electric motor 31. FIG. 9 is a timing chart showing variations in coupling timing of the electromagnetic clutch 15, the driving state of the auxiliary machinery driving electric motor 31, the number of revolutions of the electromagnetic clutch 15 (damper) or damper velocity, and the number of revolution of the crankshaft 11 or crankshaft velocity with time.

The processing routine of FIG. 5 is executed at preset time intervals. When the program enters this processing routine, the idling stop ECU 600 first determines whether or not a request is given to terminate the idling stop control process (that is, an engine restart request) at step S100. Namely the idling stop ECU 600 determines whether a restart request signal is changed from OFF to ON in the timing chart of FIG. 9. When there is no engine restart request, that is, in the case of negative answer at step S100, the idling stop ECU 600 immediately exits from this processing routine. When there is an engine restart request, that is, in the case of affirmative answer at step S100, on the other hand, the idling stop ECU 600 determines an inverted phase current Eon, which is to be supplied to the auxiliary machinery driving electric motor 31, at step S110. In accordance with a concrete procedure, the process of step S110 specifies the magnitude of the braking force (the reverse torque) of the auxiliary machinery driving electric motor 31 by taking into account the energy absorbing state of the transmission belt 16. The detailed process of DID determining the inverted phase current Eon will be discussed later with reference to FIGS. 6 through 8.

The idling stop ECU 600 then drives the auxiliary machinery driving electric motor 31 at the predetermined inverted phase current Eon at step S120. As a result, the reverse torque arises in the auxiliary machinery driving electric motor 31 to interfere with its rotations and reduce the number of revolutions or velocity of the auxiliary machinery driving electric motor 31. The idling stop ECU 600 subsequently couples the electromagnetic clutch 15 at step S130 and exits from this processing routine.

Referring to the timing chart of FIG. 9, after the restart request signal is changed from OFF to ON and the braking operation of the auxiliary machinery driving electric motor 31 starts, an electromagnetic clutch control signal is set ON to start suction of the clutch plate 151 by means of the magnetic force (clutch suction). In the transient state between a start of coupling (contact) of the clutch plate 151 with the fly wheel 152 and completion of the coupling, the electromagnetic clutch 15 is in the slipping state. In this state, the electromagnetic clutch 15 (damper) has the lowered number of revolutions or velocity, while the velocity of the crankshaft 11 starts rising. When the coupling of the clutch plate 151 with the fly wheel 152 is completed, the velocity of the electromagnetic clutch 15 is equal to the velocity of the crankshaft 11. On completion of the coupling of the electromagnetic clutch 15, the auxiliary machinery driving electric motor 31 rotates the crankshaft 11 to the engine starting speed, in order to start the engine 10. The engine ECU 610 then carries out the engine starting process. When explosion and combustion starts in any cylinder of the engine 10 (initial explosion), the auxiliary machinery driving electric motor 31 is driven by the engine 10 to generate electric power or to be at an idle.

The following describes the detailed process of determining the inverted phase current Eon with referring to FIGS. 6 through 8. The absorbing state of the kinetic energy (shocks and vibrations) of the transmission belt 16 depends upon the temperature. Direct measurement of the temperature of the transmission belt 16 is accordingly the best way to determine the kinetic energy absorbing state of the transmission belt 16. It is, however, difficult to come in direct contact with the moving transmission belt 16 and measure its temperature. The technique of this embodiment thus indirectly determines the kinetic energy absorbing state (temperature) of the transmission belt 16 according to the following procedure. In this embodiment, the temperature of the transmission belt 16 does not mean the absolute temperature of the transmission belt 16 but represents the relative temperature of the transmission belt 16 relative to variations in cooling fluid temperature Tempw and in accumulated electric motor velocity Nmsum, which are related in advance. The temperature of the transmission belt 16 may be measured directly by means of an infrared sensor or another suitable means as described later.

When the program enters the processing routine of FIG. 6, the idling stop ECU 600 first obtains the cooling fluid temperature Tempw from the cooling fluid temperature sensor 50 at step S200 and reads a cooling fluid temperature correction value Ew mapped to the input cooling fluid temperature Tempw from the map of FIG. 7 at step S210. The transmission belt 16 is generally located behind the radiator 18 and is exposed to the blast passing through the radiator 18. The temperature of the transmission belt 16 accordingly varies in proportion to a variation in temperature of the radiator 18 (that is, the cooling fluid temperature Tempw). The cooling fluid temperature Tempw is thus used as the indication of the temperature of the transmission belt 16. As shown in the map of FIG. 7, the cooling fluid temperature correction value Ew is related to the cooling fluid temperature Tempw and is used as a base value to determine the coupling timing. In the map of FIG. 7, the rate of change in cooling fluid temperature correction value Ew varies at a thermostat on temperature of the radiator 18, for example, approximately 80° C. In the temperature range close to the temperature of completing the warm-up of the engine 10, the temperature of the transmission belt 16 has reached a specific temperature range, in which the sufficient energy absorption is expected. The rate of decrease in cooling fluid temperature correction value Ew is accordingly enhanced in this temperature range.

The idling stop ECU 600 subsequently obtains the accumulated electric motor velocity Nmsum at step S220. The accumulated electric motor velocity Nmsum represents the accumulated number of revolutions of the auxiliary machinery driving electric motor 31 during a time period between a start of rotations of the auxiliary machinery driving electric motor 31 after the stop of the engine 10 by the idling stop control process and a start of the braking operation. The temperature of the transmission belt 16 is basically proportional to the temperature of the blast passing through the radiator 18 (that is, the cooling fluid temperature Tempw), but may rise independently of the cooling fluid temperature Tempw during rotations by means of the frictional heat caused by friction of the transmission belt 16 against the pulleys 125 and 126. The temperature rise of the transmission belt 16 by means of the frictional heat is proportional to the accumulated number of revolutions of the auxiliary machinery driving electric motor 31. The accumulated electric motor velocity Nmsum is accordingly used as the indication of the temperature rise of the transmission belt 16 by means of the frictional heat. The outside air temperature also affects the temperature rise of the transmission belt 16 by means of the frictional heat. The idling stop ECU 600 accordingly obtains the outside air temperature Tempo from the outside air temperature sensor 51 at step S230. The high outside air temperature accelerates the temperature rise of the transmission belt 16. The low outside air temperature, on the other hand, interferes with the temperature rise of the transmission belt 16. The idling stop ECU 600 reads an electric motor velocity correction value Em mapped to the input accumulated electric motor velocity Nmsum and the input outside air temperature Tempo from the map of FIG. 8 at step S240. In this embodiment, the electric motor velocity correction value Em monotonously decreases in proportion to an increase in accumulated electric motor velocity Nmsum. The map of FIG. 8 shows three characteristic curves with regard to the variation in outside air temperature, that is, the low temperatures (for example, lower than 0° C.), the intermediate temperatures (for example, not lower than 0° C. but lower than 30° C.), and the high temperatures (for example, not lower than 30° C.). The electric motor velocity correction value Em increases with a decrease in outside air temperature Tempo with regard to an identical accumulated electric motor velocity Nmsum. The idling stop ECU 600 calculates the inverted phase current Eon as the sum of the cooling fluid temperature correction value Ew and the electric motor velocity correction value Em at step S250, and returns to the processing routine of FIG. 5.

The following describes the effects of the braking control of the auxiliary machinery driving electric motor 31 (the regulation of the amount of power generation) discussed above with referring to the timing chart of FIG. 9. In the timing chart of FIG. 9, the solid curves represent the case of no enhancement of the. braking force (including the prior art) except the restart request signal. The broken curves represent the case of enhancement of the braking force (at the time of delay). It is here assumed that an identical axis of revolution is applied for the crankshaft velocity and the electromagnetic clutch velocity.

When the braking force is enhanced with a decrease in temperature of the transmission belt 16, the greater force is applied to brake the rotations of the auxiliary machinery driving electric motor 31 (that is, the greater amount of power generation and the greater inverted phase current). This leads to a large rate of decrease in velocity of the auxiliary machinery driving electric motor 31. At the time of starting the coupling of the electromagnetic clutch 15 to be in the clutch slipping state, the velocity of the electromagnetic clutch 15 under the enhanced braking force is reduced by approximately 60 to 70%, compared with the case of no enhancement of the braking force. This represents the difference in velocity under the coupled clutch. This decreases the difference in velocity between the crankshaft 11 and the electromagnetic clutch 15 and accordingly relieves the potential shocks and vibrations arising due to the coupling of the electromagnetic clutch 15. This arrangement results in the low energy of causing vibrations and shocks and thus relieves the potential shocks and vibrations transmitted to the vehicle body even when the temperature of the transmission belt 16 is relatively low to only insufficiently absorb the kinetic energy thereof. The inverted phase current Eon is varied according to the kinetic energy state of the transmission belt 16 (that is specified by the temperature as the indication). In the case where the transmission belt 16 can absorb the shocks and vibrations arising due to the coupling of the electromagnetic clutch 15, the coupling timing is advanced to give the preference to the starting ability of the engine 10.

In the case where the braking force of the auxiliary machinery driving electric motor 31 is fixed irrespective of the temperature of the transmission belt 16, the greater braking force applied to the auxiliary machinery driving electric motor 31 by taking into account the cold time lowers the velocity of the auxiliary machinery driving electric motor 31 below the required level and delays the time required for restarting the engine 10 even under the condition of the high temperatures of the transmission belt 16. The smaller braking force applied to the auxiliary machinery driving electric motor 31 by giving the preference to the starting ability of the engine 10, on the other hand, causes the shocks and vibrations to be transmitted to the vehicle body especially when the temperature of the transmission belt 16 is relatively low to only insufficiently absorb the kinetic energy thereof.

The idling stop control apparatus of the present invention is described above with the preferred embodiment. The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, in the structure of the embodiment where the transmission belts 16 and 17 are located behind the radiator 18, the temperature (the energy absorbing state) of the transmission belt 16 is specified based on the cooling fluid temperature of the engine 10. In a modified structure where the transmission belts 16 and 17 are located on the surface of the radiator 18, the temperature of the transmission belt 16 may be specified based on the outside air temperature measured by the outside air temperature sensor 51. The kinetic energy absorbing state of the transmission belt 16 may be detected by non-contact means. For example, the temperature of the transmission belt 16 may be measured with a non-contact temperature sensor, for example, a thermocouple or an infrared sensor. Another applicable procedure measures the temperature of either one of the pulleys 125 and 126 that are in contact with the transmission belt 16, so as to specify the temperature of the transmission belt 16.

The technique of the embodiment specifies the temperature rise of the transmission belt 16 by means of the frictional heat based on the accumulated electric motor velocity Nmsum, which represents the accumulated number of revolutions of the auxiliary machinery driving electric motor 31 since the starting time of driving the auxiliary machinery 30. The accumulated velocity of the crankshaft 11 until an end of operation of the engine 10 may be used instead of the accumulated electric motor velocity Nmsum. Both the accumulated velocities can be used as the indication to estimate the temperature rise due to the friction of the transmission belt 16 against the respective pulleys 125 and 126.

In the structure of the embodiment, the damper is included in the electromagnetic clutch 15. The damper may alternatively be provided separately from the electromagnetic clutch 15. For convenience of explanation, the crankshaft pulley 125 and the electromagnetic clutch 15 are illustrated as separate elements in FIG. 1. The electromagnetic clutch 15 may, however, be incorporated in the crankshaft pulley 125.

The automatic transmission (AT) 22 used in the embodiment may be replaced by a manual transmission or an automatic continuous transmission. The structure using either of such alternative transmissions enables execution of the idling stop control process discussed above and exerts the similar effects to those of the embodiment using the automatic transmission.

The above embodiment regards the vehicle having only the engine 10 as the power source of the vehicle. The technique of the present invention is also applicable to a hybrid vehicle having both the engine 10 and a vehicle driving electric motor as the driving source. In the hybrid vehicle, the auxiliary machinery 30 is driven by means of the auxiliary machinery driving electric motor 31 during the execution of the idling stop control process. At the time of restarting the engine 10, the electromagnetic clutch 15 is coupled to link the rotor of the auxiliary machinery driving electric motor 31 with the crankshaft 11 of the engine 10 and thereby start driving the engine 10. Application of the present invention effectively reduces or even omits the potential shocks and vibrations arising due to the coupling of the electromagnetic clutch 15.

The scope and spirit of the present invention are indicated by the appended claims, rather than by the foregoing description.

What is claimed is:

1. An idling stop control apparatus mounted on a vehicle, wherein auxiliary machinery is driven by means of either one of an internal combustion engine and an electric motor, and an output shaft of said internal combustion engine and an output shaft of said electric motor are linked with each other via a coupling mechanism that is coupled to connect said internal combustion engine with said electric motor and is released to disconnect said internal combustion engine from said electric motor, said coupling mechanism being released and said auxiliary machinery being driven by means of said electric motor via a transmission belt while said internal combustion engine is at a stop, said idling stop control apparatus comprising:

a decision unit that determines whether a driving stop condition or a driving restart condition of said internal combustion engine is fulfilled;

a braking load specification unit that, when the driving restart condition of said internal combustion engine is fulfilled, specifies a braking load to be applied to said electric motor, in order to reduce electric motor velocity or number of revolutions of said electric motor according to a kinetic energy absorbing state of said transmission belt;

a drive stand-by unit that, when the driving restart condition of said internal combustion engine is fulfilled and said coupling mechanism is released, causes said output shaft of said internal combustion engine to be coupled with said output shaft of said electric motor via said coupling mechanism after application of the specified braking load to said electric motor; and an internal combustion engine operation control unit that executes a series of processing to restart operation of said internal combustion engine after said internal combustion engine is coupled with said electric motor via said coupling mechanism.

2. An idling stop control apparatus in accordance with claim 1, wherein said vehicle further comprises a transmission belt elasticity measurement unit that measures elasticity of said transmission belt, and said braking load specification unit determines the kinetic energy absorbing state of said transmission belt based on the observed elasticity of said transmission belt and increases the braking load with a decrease in observed elasticity of said transmission belt.

3. An idling stop control apparatus in accordance with claim 1, wherein said vehicle comprises a transmission belt temperature measurement unit that measures temperature of said transmission belt, and said braking load specification unit determines the kinetic energy absorbing state of said transmission belt based on the observed temperature of said transmission belt and increases the braking load with a decrease in observed temperature of said transmission belt.

4. An idling stop control apparatus in accordance with claim 3, wherein said transmission belt temperature measurement unit comprises a cooling fluid temperature measurement unit that measures temperature of a cooling fluid passing through said internal combustion engine, and said braking load specification unit determines the kinetic energy absorbing state of said transmission belt based on the observed temperature of the cooling fluid and increases the braking load with a decrease in observed temperature of the cooling fluid.

5. An idling stop control apparatus in accordance with claim 3, wherein said transmission belt temperature measurement unit comprises an engine velocity accumulation unit that accumulates engine velocity or number of revolutions of said internal combustion engine from a start to a stop of driving of said internal combustion engine, and said braking load specification unit determines the kinetic energy absorbing state of said transmission belt based on the accumulated engine velocity and decreases the braking load with an increase in accumulated engine velocity.

6. An idling stop control apparatus in accordance with claim 3, wherein said transmission belt temperature measurement unit comprises an electric motor velocity accumulation unit that accumulates the electric motor velocity or the number of revolutions of said electric motor after a stop of driving of said internal combustion engine, and said braking load specification unit determines the kinetic energy absorbing state of said transmission belt based on the accumulated electric motor velocity and decreases the braking load with an increase in accumulated electric motor velocity.

7. An idling stop control apparatus in accordance with claim 5, wherein said transmission belt temperature measurement unit further comprises an outside air temperature measurement unit that measures outside air temperature, and said braking load specification unit increases a rate of decrease of the braking load with an increase in observed outside air temperature.

8. A vehicle having an idling stop function to selectively stop and restart driving an internal combustion engine according to a driving state of said vehicle, wherein auxiliary machinery is driven by means of an electric motor while said internal combustion engine is at a stop and by means of said internal combustion engine while said internal combustion engine is in active state, said vehicle comprising:

a coupling mechanism that links an output shaft of said internal combustion engine with an output shaft of said electric motor, such as to be coupled to connect said internal combustion engine with said electric motor and to be released to disconnect said internal combustion engine from said electric motor;

a transmission belt that is laid through said output shaft of said internal combustion engine, an input shaft of said auxiliary machinery, and said output shaft of said electric motor;

a transmission belt state detection unit that detects a kinetic energy absorbing state of said transmission belt; and an idling stop control unit that specifies a rate of decrease in electric motor velocity or number of revolutions of said electric motor based on the detected kinetic energy absorbing state of said transmission belt, and when a driving restart condition for restarting operation of said internal combustion engine is fulfilled, lowers the electric motor velocity by the specified rate of decrease, causes said output shaft of said internal combustion engine to be coupled with said output shaft of said electric motor via said coupling mechanism, and subsequently carries out a series of processing to restart driving said internal combustion engine.

9. A vehicle in accordance with claim 8, wherein said transmission belt state detection unit detects the kinetic energy absorbing state of said transmission belt based on elasticity of said transmission belt, and said idling stop control unit enhances the rate of decrease in electric motor velocity with a decrease in elasticity of said transmission belt.

10. A vehicle in accordance with claim 8, wherein said transmission belt state detection unit detects the kinetic energy absorbing state of said transmission belt based on temperature of said transmission belt, and said idling stop control unit enhances the rate of decrease in electric motor velocity with a decrease in temperature of said transmission belt.

11. A vehicle in accordance with claim 10, said vehicle further comprising:

a heat dissipation unit that is arranged on a windward side of said transmission belt to dissipate heat of a cooling fluid, which has passed through and cooled down said internal combustion engine; and a cooling fluid temperature measurement unit that measures temperature of the cooling fluid, wherein said transmission belt state detection unit calculates the temperature of said transmission belt from the observed temperature of the cooling fluid and detects the kinetic energy absorbing state of said transmission belt based on the calculated temperature of said transmission belt.

12. A vehicle in accordance with claim 10, said vehicle further comprising an engine velocity accumulation unit that accumulates engine velocity or number of revolutions of said internal combustion engine from a start to a stop of driving of said internal combustion engine, wherein said transmission belt state detection unit calculates the temperature of said transmission belt from the accumulated engine velocity and detects the kinetic energy absorbing state of said transmission belt based on the calculated temperature of said transmission belt.

13. A vehicle in accordance with claim 10, said vehicle further comprising an electric motor velocity accumulation unit that accumulates electric motor velocity or number of revolutions of said electric motor after a stop of driving of said internal combustion engine, wherein said transmission belt state detection unit calculates the temperature of said transmission belt from the accumulated electric motor velocity and detects the kinetic energy absorbing state of said transmission belt based on the calculated temperature of said transmission belt.

14. A vehicle in accordance with claim 12, said vehicle further comprising an outside air temperature measurement unit that measures outside air temperature, wherein said transmission belt state detection unit calculates the temperature of said transmission belt from the observed outside air temperature in addition to at least one of the observed temperature of the cooling fluid, the accumulated engine velocity, and the accumulated electric motor velocity and detects the kinetic energy absorbing state of said transmission belt based on the calculated temperature of said transmission belt.

15. A vehicle in accordance with claim 8, wherein said idling stop control unit stops driving said internal combustion engine and releases said coupling mechanism when a driving stop condition of said internal combustion engine is fulfilled.

16. A vehicle having an idling stop function to selectively stop and restart driving an internal combustion engine according to a driving state of said vehicle, wherein auxiliary machinery is driven by means of an electric motor via a transmission belt while said internal combustion engine is at a stop and by means of said internal combustion engine while said internal combustion engine is in active state, said vehicle comprising:

a coupling mechanism that links an output shaft of said internal combustion engine with an output shaft of said electric motor, such as to be coupled to connect said internal combustion engine with said electric motor and to be released to disconnect said internal combustion engine from said electric motor;

a target braking velocity determination unit that determines a target braking velocity for braking said electric motor prior to a restart of driving of said internal combustion engine by taking into account temperature of said transmission belt; and an idling stop control unit that, when a driving restart condition for restarting operation of said internal combustion engine is fulfilled, drives said electric motor at the target braking velocity, causes said output shaft of said internal combustion engine to be coupled with said output shaft of said electric motor via said coupling mechanism, and subsequently carries out a series of processing to restart driving said internal combustion engine.

17. A vehicle in accordance with claim 16, said vehicle further comprising:

a heat dissipation unit that is arranged on a windward side of said transmission belt to dissipate heat of a cooling fluid, which has passed through and cooled down said internal combustion engine; and a cooling fluid temperature measurement unit that measures temperature of the cooling fluid, wherein said target braking velocity determination unit takes into account the temperature of said transmission belt based on the observed temperature of the cooling fluid and lowers the target braking velocity with a decrease in observed temperature of the cooling fluid.

18. A vehicle in accordance with claim 17, said vehicle further comprising an engine velocity accumulation unit that accumulates engine velocity or number of revolutions of said internal combustion engine from a start to a stop of driving of said internal combustion engine, wherein said target braking velocity determination unit takes into account the temperature of said transmission belt based on the accumulated engine velocity and raises the target braking velocity with an increase in accumulated engine velocity.

19. A vehicle in accordance with claim 17, said vehicle further comprising an electric motor velocity accumulation unit that accumulates electric motor velocity or number of revolutions of said electric motor after a stop of driving of said internal combustion engine, wherein said target braking velocity determination unit takes into account the temperature of said transmission belt based on the accumulated electric motor velocity and raises the target braking velocity with an increase in accumulated electric motor velocity.

20. A vehicle in accordance with claim 18, said vehicle further comprising an outside air temperature measurement unit that measures outside air temperature, wherein said target braking velocity determination unit varies a rate of increase in target braking velocity according to the observed outside air temperature.

21. A vehicle in accordance with claim 20, wherein said target braking velocity determination unit enhances the rate of increase in target braking velocity with an increase in observed outside air temperature.

22. A vehicle in accordance with claim 16, wherein said idling stop control unit stops driving said internal combustion engine and releases said coupling mechanism when a driving stop condition of said internal combustion engine is fulfilled.

23. A method of controlling idling stop in a vehicle that has an idling stop function to selectively stop and restart driving an internal combustion engine according to a driving state of said vehicle, wherein auxiliary machinery is driven by means of an electric motor while said internal combustion engine is at a stop, said method comprising the steps of:

detecting a kinetic energy absorbing state of a transmission belt that is laid through said internal combustion engine, said electric motor, and said auxiliary machinery;

determining whether or not a driving restart condition for restarting operation of said internal combustion engine is fulfilled;

when it is determined that the driving restart condition is fulfilled, specifying a rate of decrease in electric motor velocity or number of revolutions of said electric motor based on the detected kinetic energy absorbing state of said transmission belt; and lowering the electric motor velocity by the specified rate of decrease and subsequently causing said output shaft of said internal combustion engine to be coupled with said output shaft of said electric motor via said coupling mechanism, so as to restart driving said internal combustion engine.

24. A method in accordance with claim 23, said method further comprising the steps of:

measuring elasticity of said transmission belt;

detecting the kinetic energy absorbing state of said transmission belt based on the observed elasticity of said transmission belt; and enhancing the rate of decrease in electric motor velocity with a decrease in observed elasticity of said transmission belt.

25. A method in accordance with claim 23, said method further comprising the steps of:
- measuring temperature of said transmission belt;
- detecting the kinetic energy absorbing state of said transmission belt based on the observed temperature of said transmission belt; and
- enhancing the rate of decrease in electric motor velocity with a decrease in observed temperature of said transmission belt.

26. A method in accordance with claim 25, said method further comprising the steps of:
- measuring temperature of a cooling fluid that passed through said internal combustion engine; and
- enhancing the rate of decrease in electric motor velocity with a decrease in observed temperature of the cooling fluid.

27. A method in accordance with claim 26, said method further comprising the steps of:
- accumulating engine velocity or number of revolutions of said internal combustion engine from a start to a stop of driving of said internal combustion engine; and
- lowering the rate of decrease in electric motor velocity with an increase in accumulated engine velocity.

28. A method in accordance with claim 26, said method further comprising the steps of:
- accumulating electric motor velocity or number of revolutions of said electric motor after a stop of driving of said internal combustion engine; and
- lowering the rate of decrease in electric motor velocity with an increase in accumulated electric motor velocity.

29. A method in accordance with claim 27, said method further comprising the steps of:
- measuring an outside air temperature; and
- enhancing the rate of decrease in electric motor velocity with an increase in observed outside air temperature.

* * * * *